United States Patent
Hughes et al.

(10) Patent No.: US 6,893,600 B2
(45) Date of Patent: May 17, 2005

(54) INJECTION MOLD MACHINE WITH REDUCED MOLD CHANGE DOWNTIME

(75) Inventors: Alan Hughes, Oxford, AL (US); Sotoru Ogura, Hoover, AL (US); Eric Pryor, Birmingham, AL (US); Ted Allison, Lincoln, AL (US); Roger Williams, Birmingham, AL (US)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 381 days.

(21) Appl. No.: 10/303,473

(22) Filed: Nov. 25, 2002

(65) Prior Publication Data

US 2004/0099995 A1 May 27, 2004

(51) Int. Cl.[7] ............................................. B29C 45/10
(52) U.S. Cl. ............................. 264/328.7; 264/328.16; 425/183; 425/190; 425/547
(58) Field of Search ........................ 264/328.7, 328.16, 264/297.2; 425/183, 190, 192 R, 195, 547

(56) References Cited

U.S. PATENT DOCUMENTS

| | | | |
|---|---|---|---|
| 3,622,045 A | 11/1971 | Delaney et al. | |
| 4,518,338 A | * 5/1985 | Hehl | 425/190 |
| 4,578,026 A | * 3/1986 | Hehl | 425/183 |
| 4,623,503 A | 11/1986 | Anestis et al. | |
| 4,691,429 A | 9/1987 | Goodsmith | |
| 4,737,093 A | * 4/1988 | Hori et al. | 425/192 R |
| 4,786,244 A | 11/1988 | Holzschuh | |
| 5,529,474 A | 6/1996 | Goh et al. | |
| 5,562,935 A | 10/1996 | Martin | |
| 6,036,469 A | 3/2000 | Allen et al. | |
| 6,338,188 B1 | 1/2002 | Allen et al. | |

* cited by examiner

Primary Examiner—Jill L. Heitbrink
(74) Attorney, Agent, or Firm—Rankin, Hill, Porter & Clark LLP; Vincent Ciamacco

(57) ABSTRACT

A die preparation and exchange method wherein dies to be inserted into an injection molding machine are electrically and fluidly heated prior to insertion so as to prepare the dies to make parts more quickly. The die exchange sequence wherein a first set of dies are removed from the machine and are replaced by a second set of dies has been changed from a generally serial sequence to a sequence wherein most steps are performed in parallel or simultaneously, greatly reducing the downtime associated with mold change.

7 Claims, 7 Drawing Sheets

INJECTION MOLD MACHINE WITH REDUCED MOLD CHANGE DOWNTIME

BACKGROUND OF THE INVENTION

1. Field of the Invention

The present invention generally relates to plastic injection molding machines and, more particularly, toward improved methods for exchanging molds for use in injection molding machines.

2. Description of Related Art

Injection molding machines have developed over the years to permit molding of a variety of parts, from small, simple plastic parts to rather large and complex plastic parts. For large parts, such as automobile bumpers, the injection molding machines and resulting injection molding dies are correspondingly large and heavy.

Due to the relatively short mold cycle time as compared to the rest of the factory, when using such large injection molding machines in a modern manufacturing environment, it is common to mold a particular part for a period of time with the first set of dies and then to exchange the first set of dies with a second set of dies to permit a different part to be molded. By switching the dies, the number of parts made with a single molding machine is increased. However, the die changing process has, in the past, been a time consuming operation requiring a significant amount of manual labor, and has resulted in a significant amount of down time for the machine. The manual labor involved in changing the dies is the result of the fact that each of the dies has a series of electrical, hydraulic, and cooling water connections that must be first unplugged from the first set of dies in order to permit the first set of dies to be removed from the machine. Thereafter, after the second set of dies is installed in the machine, these electrical, hydraulic, and cooling water connections must again be connected to the second set of dies. Since the number of connections may be between about 10–15, there is a significant amount of time involved, and is rather complicated for the operator.

Such large injection molding machines include an injector, a die assembly comprising a fixed die and a movable die, and die loading/unloading assembly including a movable mold transfer cart, and a part removal apparatus. The movable die is secured to a platan that is movable relative to the fixed die between a closed position and an open position.

The injector receives solid palletized or granular plastic material, heats and melts the plastic material, and pressurizes and injects the melted plastic into the die assembly. A screw type injector may be used in this regard. The die assembly receives the injected melted plastic and holds the plastic material until it solidifies, at which point the dies are moved apart to reveal the part. Ejectors are preferably built into the movable die, and serve to separate the molded part from the movable die. The part removal apparatus grasps the part, removes the part from the dies, and transports the part away from the dies.

The die loading/unloading assembly is used to replace or exchange dies in the machine, when necessary. In order to exchange a first set of dies in the machine with the second set of dies, which are stored on the mold transfer cart, the first set of dies are slid out of the machine and onto the transfer cart by the die loading/unloading assembly. Thereafter, the transfer cart is translated laterally to align the second set of dies with the opening in the machine, and then the second set of dies are slid into the machine by the die loading/unloading assembly.

More specifically, steps performed in a mold change sequence according to the prior art are illustrated in FIG. 1. First, the hoses and cables are disconnected. This step takes an inordinately large period of time because each of the dies has a plurality of hoses and cables connected thereto, and each of the hoses and cables must be individually separately disconnected and moved out of the way. Thereafter, the molds are unclamped, and then the rear machine door is opened. The molds are carried out by the die loading/unloading assembly, which conventionally includes a drive roller and idle rollers built into the machine and the transfer cart. Thereafter, the rear door is closed, and then the transfer cart is moved to place the second set of molds into alignment with the rear door opening. Simultaneously, a data conversion is performed to adjust for the change from the first die set to the second die set. The platan is positioned to receive the second mold set, and then the rear door is opened. The platan positioning is performed after the data conversion, but partially simultaneously with the movement of the transfer cart. The rear door is opened after the platan is positioned, and then the die loading/unloading assembly carries the second set of dies into the machine.

Once the second set of dies are inside the machine, the rear door is closed. Once the door is closed, the dies are clamped into place, a mold thickness step is performed, and the hoses and cables are reconnected. Mold thickness refers to calibration of the machine to the size of the dies to establish zeroes or set point positions. As when the hoses/cables are disconnected, reconnecting the hoses and cables takes and inordinately large period of time. When reconnecting the hoses and cables, care must be taken to make sure that the correct connections are made. Thus, locating the hoses/cables, and correctly reconnecting them to the mold takes a great amount of time.

As will be appreciated, the vast majority of the prior art mold change steps are performed sequentially or serially. Therefore, apart from speeding up any of the steps, there is little that can be done to improve the conventional serial operation of the prior art method and, more specifically, little that can be done to reduce the length of the prior art mold change method.

With reference to FIG. 2, a prior art machine operating method surrounding the mold change sequence of FIG. 1 is disclosed. As will be seen, the machine operating method also employs a generally sequential operation. Following production of the last part using the first set of dies, the R/B home is performed wherein the part removal apparatus is moved to a pre-programmed position by use a pendant control mechanism. Thereafter, the screw unit of the injector assembly is retracted, and then rust protection is applied to the first set of dies. Following application of the rust protection, the mold is closed and the cores are drained. Thereafter, the first set of dies is exchanged with the second set of dies, as discussed hereinbefore with reference to FIG. 1. Once the second set of dies are installed in the machine, the safety drop bar is set whereby the safety bar is moved into a position by a servo-driven screw to place a mechanical stop in place to prevent the movable platan from advancing forward anytime the machine front door is in the open position. Thereafter, an operational check, which is a check performed by the operator to visually confirm hydraulic units are functioning properly, is performed, and the screw unit is advanced. Since the R/B attachment change, wherein the part grasping head or chuck has been replaced with a part grasping head or chuck adapted to receive the new part, has been previously performed, the dies are monitored until plastization or melting of the plastic pellets occurs and then parts can begin to be made. As noted before with regard to the mold changing sequence, since the steps in the overall machine operating method associated with the machine operation surrounding the mold change are sequential or serial in nature, it is difficult or impossible to significantly reduce the time required. This has been an often-criticized problem with large injection molding machines that the industry has tolerated for years.

Since the second set of dies are cold when they are inserted into the machine, the second set of dies must be heated up to a molding temperature before good parts can be produced. Typically, the second dies are heated by electrical heating means built into the mold. When the plastic within the mold becomes liquid, which may take up to about 30 minutes, molding may begin. However, due to required normalization of the dies, it is commonly necessary to make a series of parts, sometimes up to a dozen parts, before good parts are made. Therefore, in addition to a great loss of time, the conventional mold-changing technique results in significant amount of waste.

As will be appreciated by those skilled in the art, machine down time resulting from die changes reduces the production of the machine in a given time period, and needs to be minimized to increase the productivity and efficiency of the manufacturing operation.

Therefore, there exists a need in the art for a method of reducing the downtime associated with mold change. Moreover, there exists a need in the art for speeding connection and disconnection of hydraulic and electrical connections during a mold change.

SUMMARY OF THE INVENTION

The present invention is directed toward a method for reducing a downtime of an injection molding machine during exchange of dies. The present invention is further directed toward a method and apparatus for speeding connection and disconnection of hydraulic and electrical connections associated with dies used in an injection molding machine.

In accordance with the method of the present invention, the machine includes a first set of dies installed within the machine and a second set of dies stored on a mold transfer cart of the machine. The method includes the steps of preheating the second set of dies, disconnecting electrical cables and hoses from the first and second sets of dies, unclamping the first set of dies, and simultaneously opening a rear door of the injection molding machine. The method further includes the steps of, following unclamping of the first set of dies, moving the first set of dies onto a mold transfer cart and, immediately following placement of the first set of dies on the mold transfer cart, moving the cart to place the second set of dies in position to be installed in the injection molding machine. While moving the second set of dies in position for installation in the injection molding machine, the die platans are positioned to receive the second set of dies and, at least partially simultaneously with the platan positioning step, the second set of molds are moved into the injection molding machine. Thereafter, the second set of dies is clamped within the injection molding machine and the hoses and cables are reconnected to the second set of dies.

BRIEF DESCRIPTION OF THE DRAWINGS

These and further features of the invention will be apparent with reference to the following description and drawings, wherein.

DETAILED DESCRIPTION OF THE PREFERRED EMBODIMENTS

Figure 3:
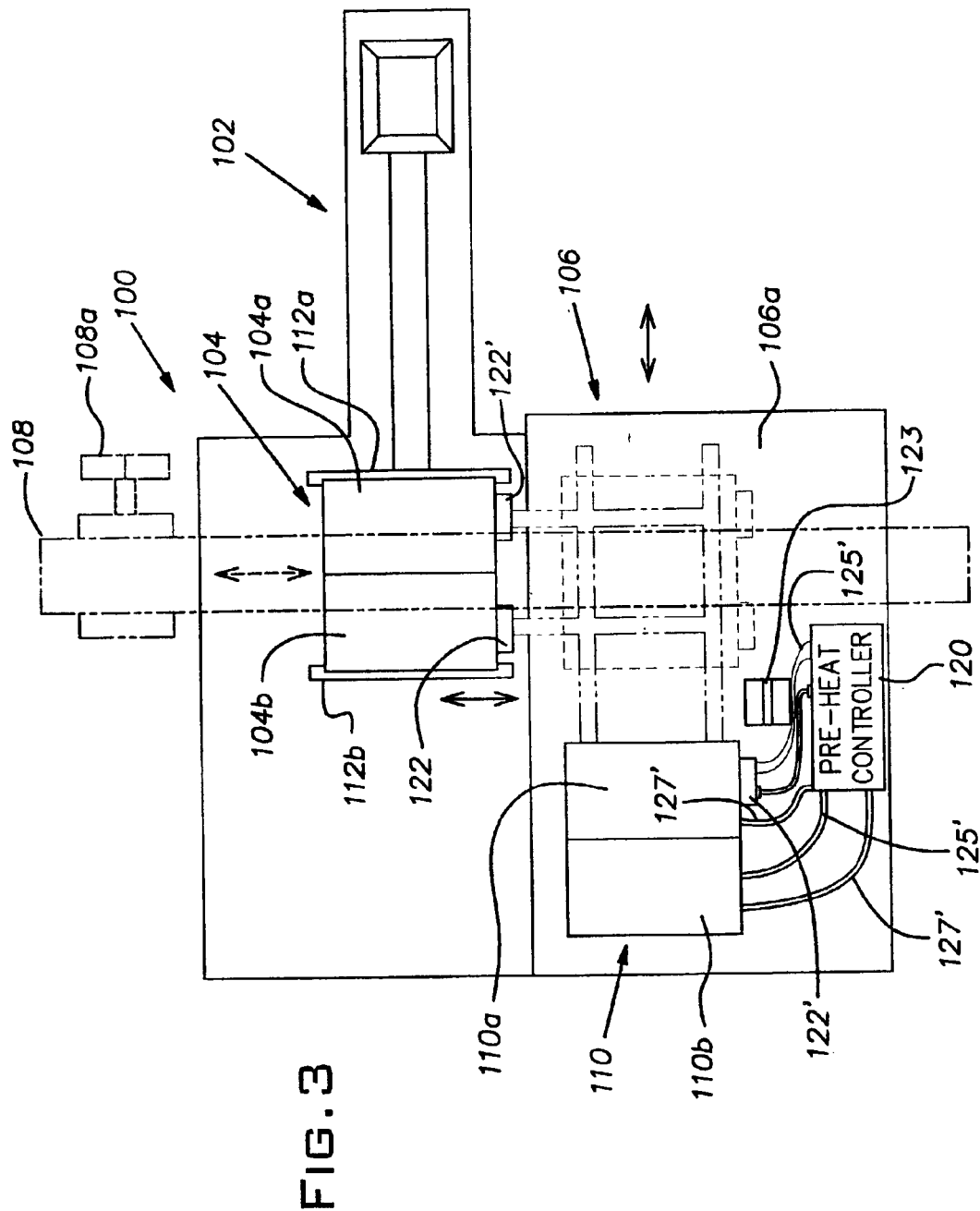
FIG. 3 schematically illustrates an injection molding machine according to the present invention.

With reference to FIG. 3, an injection molding machine 100 according to the present invention is schematically illustrated. The injection molding machine includes an injector 102, a first die assembly 104 comprising a first fixed die 104a and a first movable die 104b, a die loading/unloading assembly 106 including a translatable mold transfer cart 106a, a part removal apparatus 108, and a second die assembly 110 comprising a second fixed die 110a and a second movable die 110b.

The first fixed die 104a is secured to a fixed die platan 112a, and the first movable die 104b is secured to a movable die platan 112b. The movable die platan 112b is moved relative to the fixed die 104a between a closed position and an open position. When the movable die platan 112b and associated movable die 104b are in the closed position, the first set of dies 104 is in position to mold a part. When the movable die platan 112b moves the movable die 104b to an open position, the molded part may be removed from the first die assembly 104.

The injector 102 receives solid palletized or granular plastic material, heats and melts the plastic material, and pressurizes and injects the melted plastic into the die assembly 104. A screw type injector may be used as the injector. The first die assembly 104 receives the injected melted plastic and holds the plastic material until it solidifies, at which point the dies 104a, 104b are moved apart to reveal the part, as discussed previously. Ejectors are preferably built into the movable die 104b, and serve to separate the molded part from the movable die 104b. The fixed die 104a, 110a includes electrical resistance heaters (not shown) to keep the plastic liquid as it moves into the die assembly 104, and each of the fixed and movable dies 104a, 104b; 110a, 110b has a cooling water circuit through which cold water is circulated to assist in cooling and solidifying the molded plastic part.

The part removal apparatus 108 grasps the part, removes the part from the die assembly 104, and transports the part away from the dies. In this case, the part removal apparatus 108 is an overhead-type trolley carrying a part-grasping head 108a. The part grasping head 108a is specially adapted to hold the particular part being molded. Therefore, when the first set of dies 104 is exchanged for the second set of dies 110, the part grasping head 108a must also be exchanged. In this regard it is noted that the prior art method employed a manual step to transfer the robot to an attachment exchange (chuck change) position prior to performing any operational checks. However, the present invention makes this function automatic when the injection carriage is retracting. The inverse is likewise true in that following chuck change the robot is returned to operating position by activation of one push button on the operators control panel. Therefore, significantly less user interaction is now required to change the chuck or grasping head than was required with the prior art method.

The die loading/unloading assembly 106 is used to replace or exchange dies in the machine 100, when desired. In order to exchange the first set of dies 104 in the machine with a second set of dies 110, which are stored on the mold transfer cart 106a, the first set of dies 104 are slid out of the machine and onto the transfer cart 106a by the die loading/unloading assembly. Thereafter, the transfer cart 106a is translated laterally (to the right in FIG. 3) to align the second set of dies 110 with the opening in the machine, and then the second set of dies 110 are slid into the machine by the die loading/unloading assembly.

The machine further includes a die pre-heating assembly, including a preheat controller 120 and a pre-heat connection assembly 122'. The pre-heat controller 120 is provided to supply heating fluid via inlet and outlet hoses 125', 127' to the second set of dies 110 and to provide electrical power to the resistance heaters within the fixed die 110a of the second set of dies 110 via the pre-heat connection assembly 122'. Generally, and as noted hereinbefore, the movable and fixed dies 110b, 110a include or define cooling water circuits therethrough by means of which cooling water, during use of the dies to form parts, may be directed through the dies 110a, 110b to help keep portions of the dies at a reduced temperature during use and thereby assist in solidification of the plastic part. During the preheating stage, the present invention takes advantage of these cooling water circuits; however, instead of cooling water, the present invention circulates heated water through the cooling water circuits to preheat the dies 110a, 110b. Accordingly, the second set of dies 110 is preheated by the electrical resistance heaters in the fixed die 110a and by the heated water circulated through the cooling water circuit of the fixed and movable dies 110a, 110b. Therefore, each of the second fixed and movable dies 110a, 110b is brought up to an elevated temperature closer to the molding temperature before they are inserted in the machine, normalizing the dies and, therefore, permitting almost immediate molding of parts with the second set of dies 110.

Figure 4A:
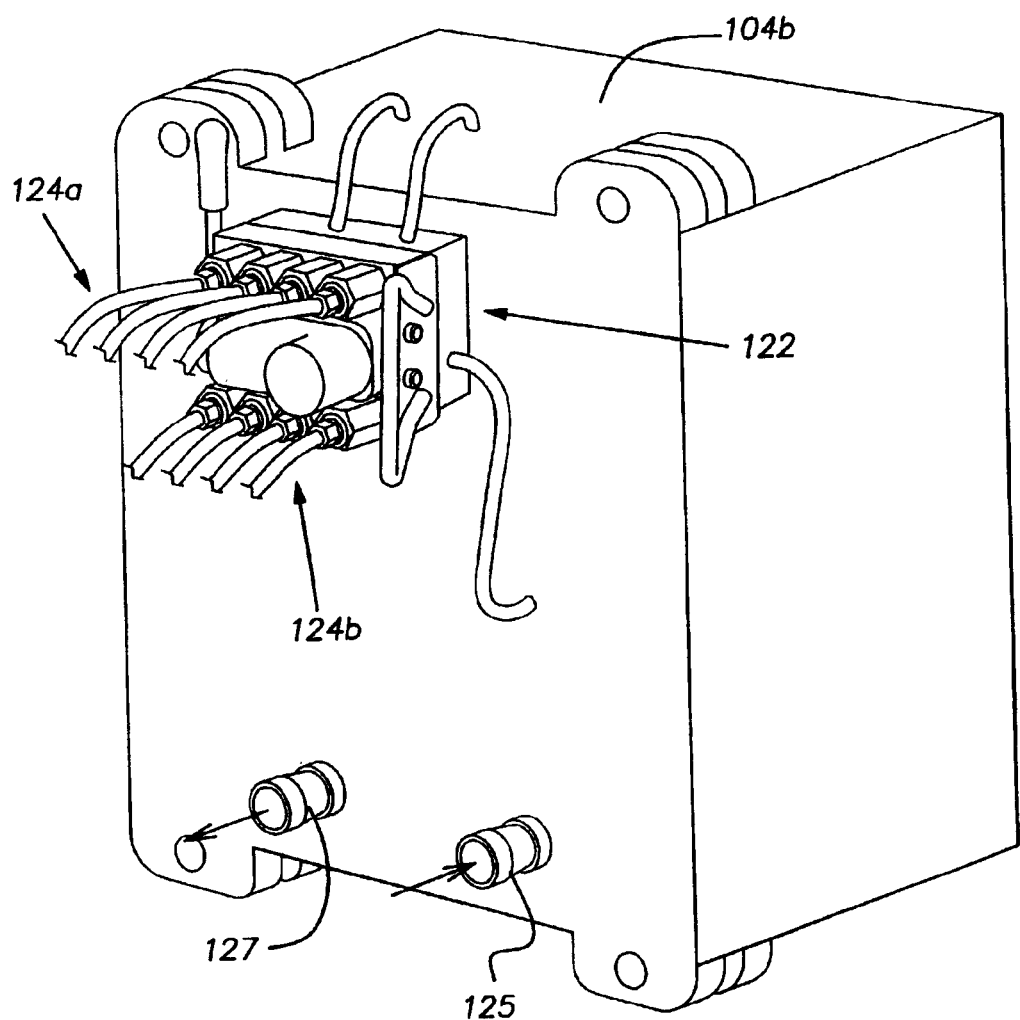
FIG. 4a is a schematic perspective view of a connection assembly secured to a first movable die according to the present invention.

A connection assembly 122 is schematically illustrated in FIG. 4 secured to the first movable die 104b, it being understood that a generally identical connection assembly is secured to the first fixed die 104a. It is further noted that, with the exception of the hydraulic lines/connections 124b, the connection assembly 122 is substantially identical to the preheat connection assembly 122' described hereinbefore. As shown, the connection assembly 122 includes a backing plate to which a plurality of electrical cables 124a and hydraulic hoses 124b are secured. Similar hoses and cables, prior to the present invention, were separately and individually connected to the mold. However, with the present invention, the hoses 124b and cables 124a may be secured to the die or removed from the die with one connecting or disconnecting operation by means of the connection assembly 122, respectively. As will be appreciated by those skilled in the art, and with reference to FIGS. 3 and 4a, a connection assembly is secured to each of the first movable and fixed dies 104b, 104a. The connection assembly provides electrical connectors for various electrical components disposed within the molds (i.e., resistance heaters, position sensors, limit switches, etc.) and hoses for communication of fluid to the mold for various purposes (i.e., hydraulic lines to permit movement of movable units within the die 104).

Figure 4B:
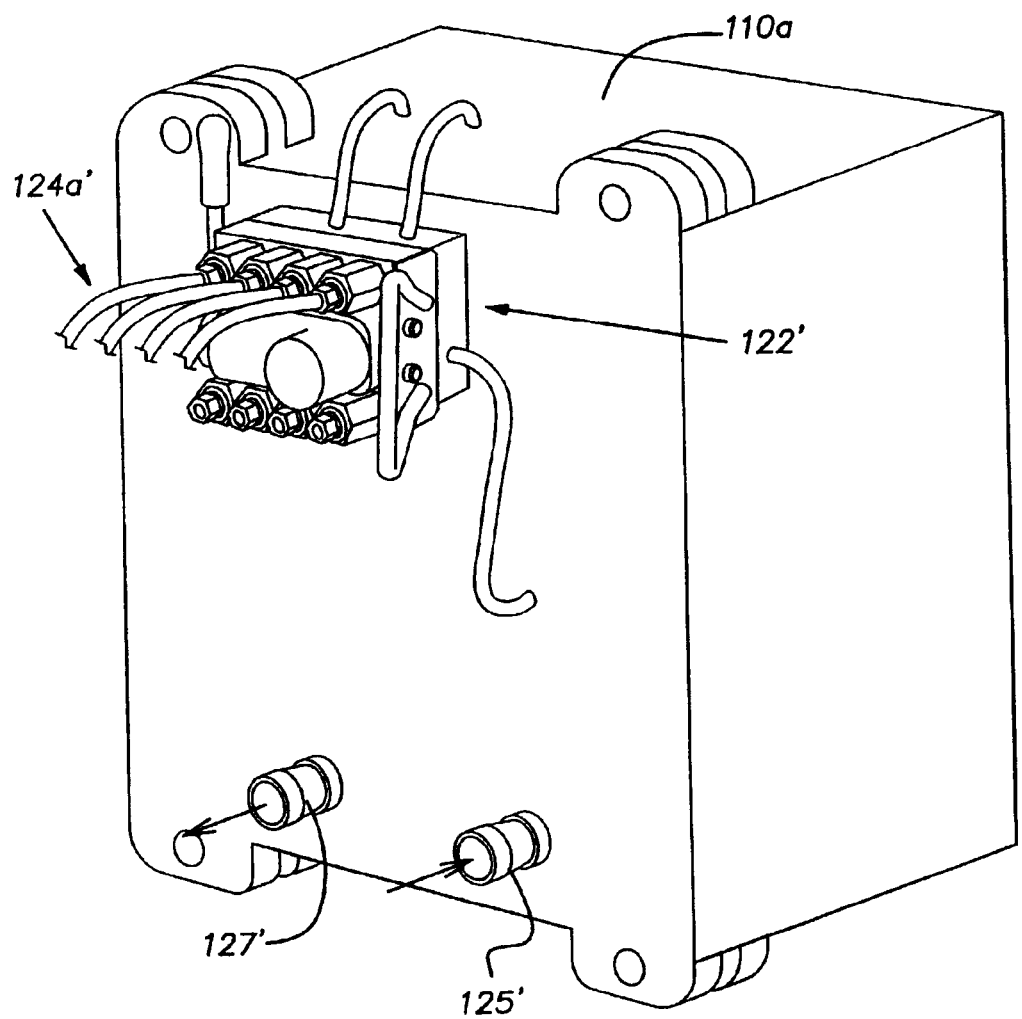
FIG. 4b is a schematic perspective view of a connection assembly secured to a second fixed die during a preheat step.

For the second set of dies 110, a connection assembly 122' is connected to the fixed die 110a to connect the resistance heaters therein to the pre-heating controller 120. Insofar as the preheating step does not require hydraulic actuation or movement of internal die parts, only electrical cables 124a' are shown as being connected by the preheat connection assembly 122' to the die 110a (FIG. 4b). As noted hereinbefore, heated water provided by the preheat controller 120 is directed, via an inlet 125' and an outlet 127' through the fixed and movable dies 110a, 110b to bring them up to, or close to, a molding temperature and serves to normalize the dies. Due to the large heat sink represented by the dies when molding a large part, this pre-heating step may take a rather long time (i.e., two hours).

Figure 5:
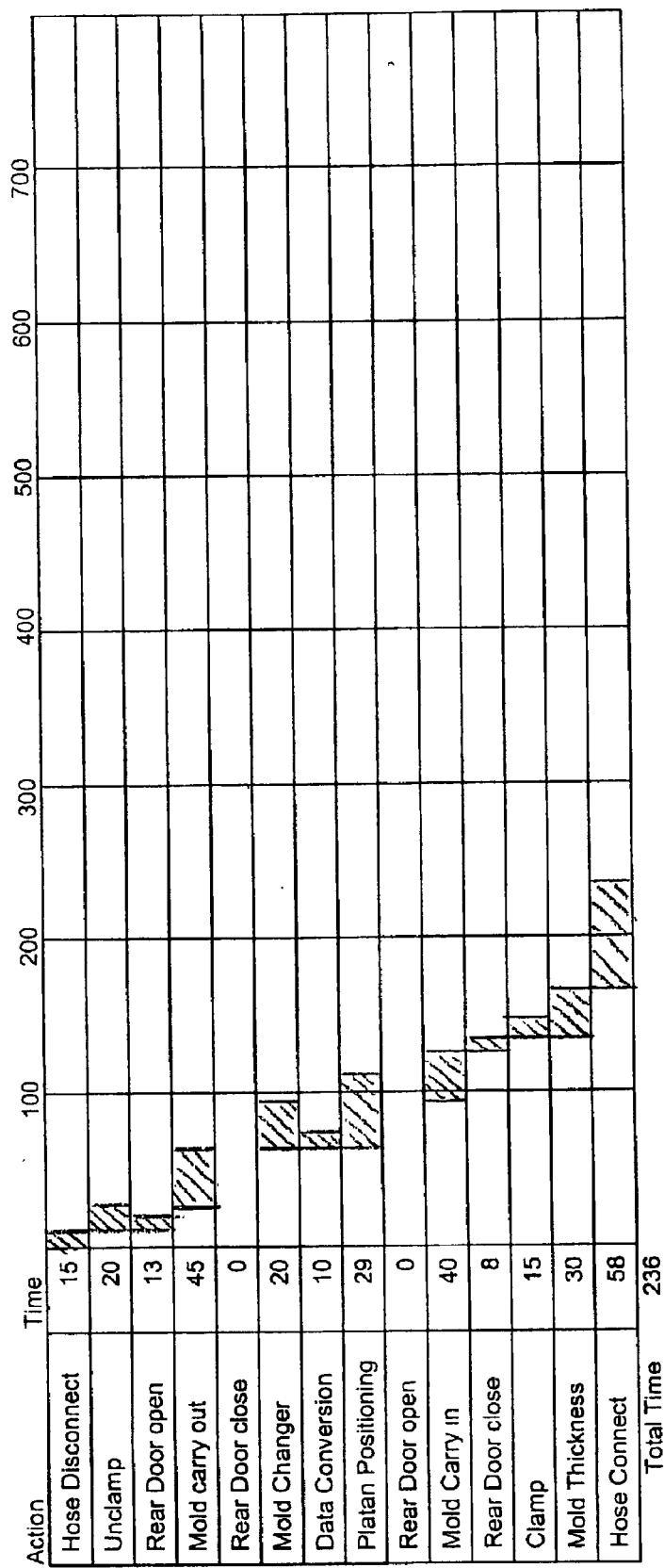
FIG. 5 is a flow chart illustrating steps according to the mold change method of the present invention; and, FIG. 6 is a flow chart illustrating a machine operation method including a mold change method according to the present invention.

The die changing method of the present invention is illustrated in FIG. 5. As will be appreciated from the following discussion, as compared to the prior art method illustrated in FIG. 1, the inventive method greatly speeds the die exchange sequence and thereby reduces downtime. It is noted that, prior to the die exchange sequence, the second set of dies 110 are preheated using the preheating assembly, described hereinbefore. First, the preheat connection assembly 122' and the heated water inlet hoses 125', 127' are disconnected from the second set of dies 110. The hydraulic hoses 124b and electrical cables 124a are disconnected from the first set of dies 104 by operation of the connection assemblies 122. The free preheat connection assembly 122', which was previously connected to the second fixed die 110a, is now stored on a stand 123 that is disposed on the transfer cart 106a at a location convenient for all potential die storage locations. The heated water hoses 125', 127' may also be secured to and stored on the stand 123. The stand 123 is positioned and adapted to securely retain the preheat connection assembly 122' in a convenient location for subsequent access.

The free connection assemblies 122 that were associated with the first die assembly 104 are now retained in a desirable position by a suspension assembly including support wires and counterweights, as is known in the art, and then the first set of dies is unclamped from the machine and, simultaneously with the unclamping step, the rear door is opened. Once the dies are unclamped, which takes slightly longer than the time required to open the rear door, the first set of dies 104 is carried out of the machine and onto the die transfer cart by the die loading/unloading assembly. Once the first set of dies 104 is on the cart 106a, the die transfer cart 106a is moved laterally (to the right in FIG. 3) so as to place the second set of dies 110 in position for introduction in the machine, it being noted that prior art step of closing of the rear door is skipped as unnecessary. While the die transfer cart 106a is moving, a data conversion and platan positioning is performed. After the die transfer cart 106a has moved the second set of dies 110 into a loading position, but before the platan has reached its final position, the carrying-in of the second set of dies 110 into the machine is begun. In this regard it is noted that the prior art method step of opening the rear door is not necessary since the rear door is already open. After the second set of dies 110 is installed in the machine, the rear door is closed, and the dies 110 are clamped in position. While the dies are being clamped, the mold thickness or calibration step is performed. Thereafter, the hydraulic hoses 124b and electrical cables 124a are connected to each of the movable and fixed dies of the second set of dies 110 via the connection assemblies 122 previously secured to the first set of dies 104, the cold water circulating hoses are connected to the inlet 125 and outlet 127, and the mold exchange process is complete.

Figure 1:
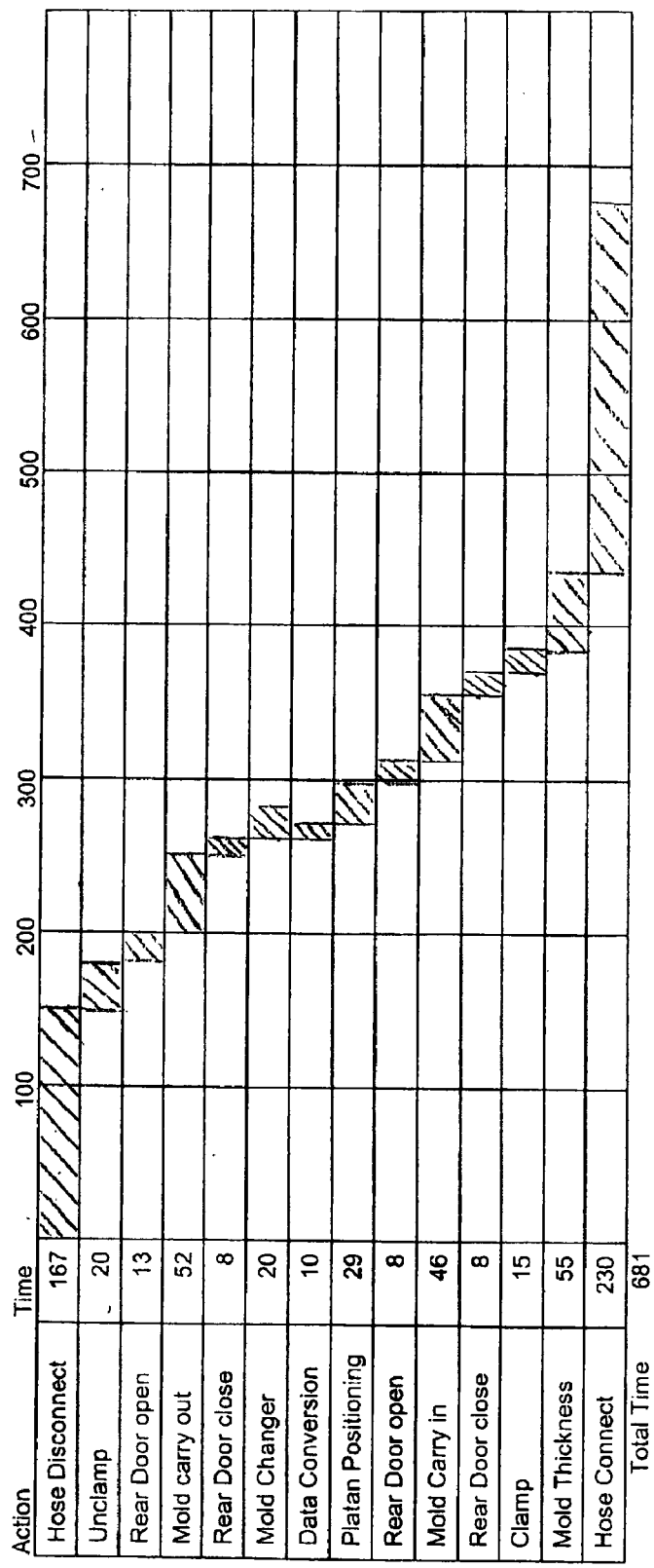
FIG. 1 is a flow chart illustrating steps of a mold change method according to the prior art.

It is noted that the time required to perform the mold exchange method of the present invention is significantly shorter than that of the prior art described hereinbefore with regard to FIG. 1. This reduction in time is attributable to the time savings from use of the connection assembly, the parallel operation of a series of the method steps, described hereinbefore, as well as mechanical changes to the operation of machine components that speed-up the mold changing. For example, although the same motor and mechanical system is used in the die loading/unloading assembly as in the prior art system, the motor frequency has been increased to the maximum rated frequency of the motor and, therefore, the motor has been sped-up relative to its operation under in prior art. These time savings are compounding and, based upon testing conducted by the inventors, have resulted in an average time reduction from 681 seconds (11 minutes, 21 seconds) under the prior art to 236 seconds (3 minutes, 56 seconds) with the inventive method. This amounts to a 445 second (7 minutes, 25 seconds) savings each time the molds are changed.

Figure 6:
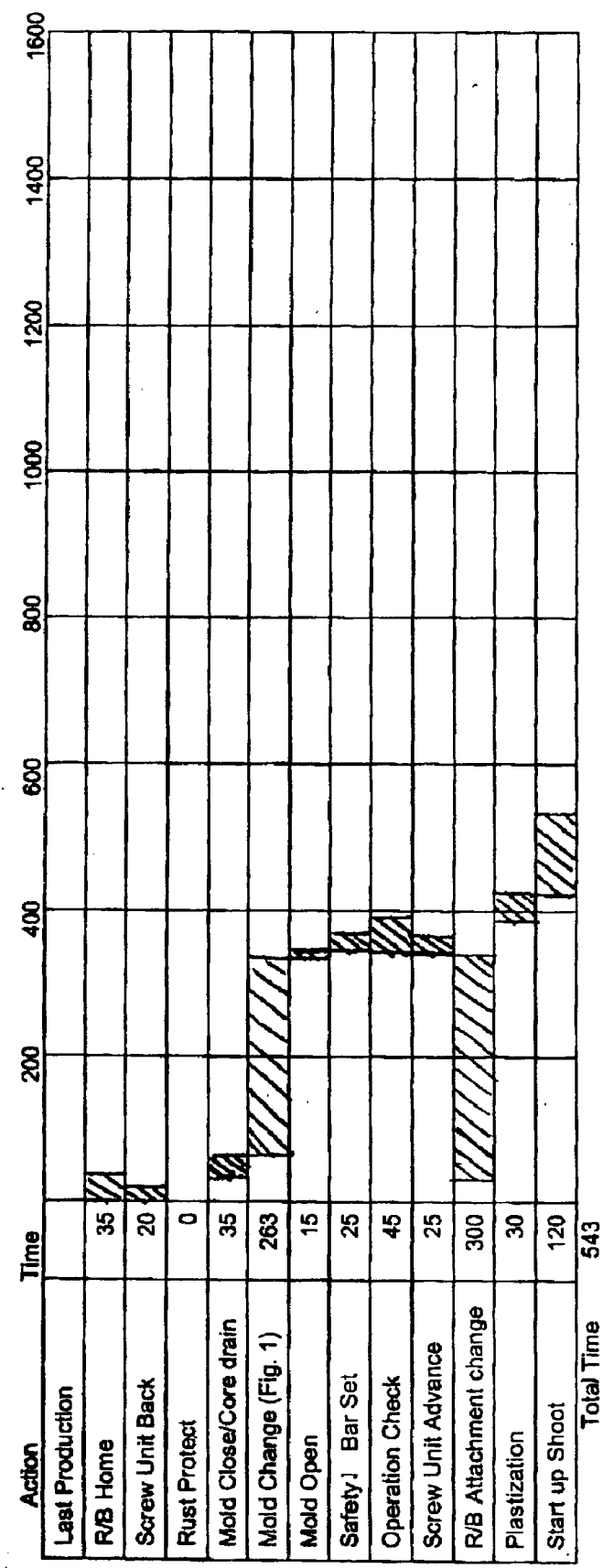

A machine operation method including a mold change method according to the present invention is illustrated in FIG. 6. Following a production of the last part using the first set of dies, the R/B home step is performed. Simultaneously, the screw unit of the injector assembly is retracted. The rust protection step taught in the prior art is avoided, and is instead performed after the first set of dies is removed from the machine. After the R/B home step, the mold is closed and the core is drained, and then the first set of dies are exchanged with the second set of dies, as described hereinbefore with reference to FIG. 5. Once the second set of dies are installed in the machine, a series of essentially simultaneous steps are performed. These include setting the safety drop bar, performing an operational check, and advancing the screw unit. With the R/B attachment change being previously performed, the dies are monitored until plastization occurs, and then parts can begin to be made.

Figure 2:
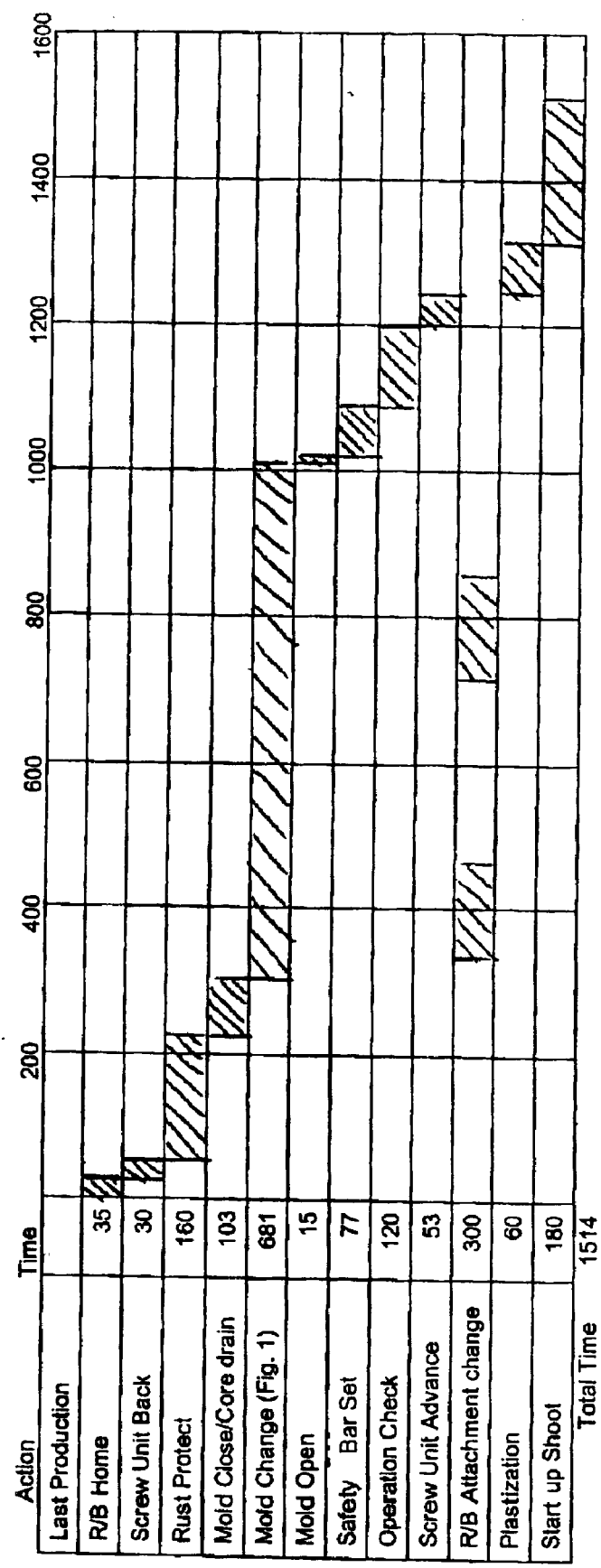
FIG. 2 is a flow chart illustrating method steps of machine operation including a mold change method according to the prior art.

As evidenced by the foregoing, the overall downtime of the machine from the making of the last part with the first set of dies to the making of parts with the second set of dies is reduced from greater than 25 minutes (1514 seconds) with the prior art method shown in FIG. 2, to less than 10 minutes (543 seconds) with the present invention. Accordingly, more than 15 minutes in machine downtime is eliminated each time the dies are changed.

What is claimed is:

1. A method for exchanging a first set of dies with a second set of dies in an injection molding machine, comprising the steps of:
   connecting the second set of dies to a preheat controller by means of a preheat connection assembly;
   preheating the second set of dies;
   disconnecting the preheat connection assembly from the second set of dies;
   storing the preheat connection assembly on a stand that is disposed adjacent the second set of dies;
   disconnecting a machine connection assembly from said first set of dies, said preheat connection assembly and said machine connection assembly being compatible such that each may be connected to any of said first and second set of dies;
   unclamping the first set of dies and simultaneously opening a rear door of said injection molding machine;
   following unclamping of the first set of dies, moving the first set of dies onto a mold transfer cart;
   immediately following placement of the first set of dies on the mold transfer cart, moving the cart to place the second set of dies in position to be installed in the injection molding machine;
   while moving the second set of dies in position for installation in the injection molding machine, positioning the die platans to receive the second set of dies;
   at least partially simultaneously with the platan positioning step, moving the second set of molds into the injection molding machine;
   clamping the second set of dies within the injection molding machine; and,
   reconnecting the hoses with the second set of dies.

2. The method of claim 1, wherein a time period for exchanging the first set of dies with the second set of dies is less than 11 minutes.

3. The method of claim 2, wherein the time period is less than 8 minutes.

4. The method of claim 3, wherein the time period is less than 4 minutes.

5. The method of claim 1, wherein the second set of dies are preheated on the mold transfer cart, and wherein prior to movement of the mold transfer cart, hoses are disconnected from the second set of dies.

6. The method of claim 5, wherein preheating of the second set of dies is started a predetermined time period before the second set of dies are installed in the molding machine.

7. A method for exchanging a first set of dies with a second set of dies in an injection molding machine, comprising the steps of:
   preheating the second set of dies by performing the following steps:
      connecting a preheat connection assembly to said second set of dies, said preheat connection assembly being adapted to electrically connect electrical resistance heaters in said second set of dies to an electrical source; and,
      directing a flow of heated water through a cooling water circuit defined by said second set of dies;
   and, following said preheating step:
   disconnecting the preheat connection assembly from the second set of dies;
   disconnecting a machine connection assembly from said first set of dies, said preheat connection assembly and said machine connection assembly being compatible such that each may be connected to either of said first and second set of dies;
   unclamping the first set of dies and simultaneously opening a rear door of said injection molding machine;
   following unclamping of the first set of dies, moving the first set of dies onto a mold transfer cart;
   immediately following placement of the first set of dies on the mold transfer cart, moving the cart to place the second set of dies in position to be installed in the injection molding machine;
   while moving the second set of dies in position for installation in the injection molding machine, positioning the die platans to receive the second set of dies;
   at least partially simultaneously with the platan positioning step, moving the second set of molds into the injection molding machine;
   clamping the second set of dies within the injection molding machine; and,
   reconnecting the hoses with the second set of dies.

* * * * *